(12) United States Patent
Bajpai et al.

(10) Patent No.: US 9,007,915 B2
(45) Date of Patent: *Apr. 14, 2015

(54) METHOD AND NODE FOR TRANSMITTING DATA OVER A COMMUNICATION NETWORK USING NEGATIVE ACKNOWLEDGMENT

(75) Inventors: Parimal Bajpai, Bangalore (IN); Vikal Kumar Jain, Bangalore (IN); Aparma Sarma Akella, Bangalore (IN)

(73) Assignee: Sling Media PVT Ltd., Bangalore (IN)

( * ) Notice: Subject to any disclaimer, the term of this patent is extended or adjusted under 35 U.S.C. 154(b) by 9 days.

This patent is subject to a terminal disclaimer.

(21) Appl. No.: 13/458,840

(22) Filed: Apr. 27, 2012

(65) Prior Publication Data

US 2012/0213055 A1    Aug. 23, 2012

Related U.S. Application Data

(63) Continuation of application No. 12/404,920, filed on Mar. 16, 2009, now Pat. No. 8,169,914.

(51) Int. Cl.
   *G01R 31/08* (2006.01)
   *G06F 11/00* (2006.01)
   *G08C 15/00* (2006.01)
   *H04J 1/16* (2006.01)
   *H04J 3/14* (2006.01)
   (Continued)

(52) U.S. Cl.
   CPC ............ *H04L 1/1628* (2013.01); *H04L 1/1864* (2013.01); *H04L 1/1893* (2013.01); *H04L 1/1896* (2013.01)

(58) Field of Classification Search
   CPC .... H04L 1/1628; H04L 1/1864; H04L 1/1896
   USPC ........... 370/229, 235, 236, 400; 714/748, 749
   See application file for complete search history.

(56) References Cited

U.S. PATENT DOCUMENTS 5,519,704 A    5/1996  Farinacci et al.
6,031,843 A    2/2000  Swanbery et al.
(Continued)

OTHER PUBLICATIONS

"Transmission Control Protocol", retrieved from internet site: http://en.wikipedia.org/w/index.php? title=Transmission_Control_Protocol&printable=yes on Jun. 15, 2009, 17 pages.
(Continued)

*Primary Examiner* — Ayaz Sheikh
*Assistant Examiner* — Tarell Hampton
(74) *Attorney, Agent, or Firm* — Ingrassia Fisher & Lorenz, P.C.

(57) ABSTRACT

A method of transmitting data over a communication network using negative acknowledgment is presented. In the method, a stream of data packets is transmitted from a first node of the network to a second node of the network. All but at least two of the stream of data packets is successfully received at the second node, wherein the data packets that are not successfully received are not located sequentially within the stream of data packets. A status packet is transmitted from the second node to the first node, wherein the status packet includes an indication of each of the data packets that were not successfully received. In response to receiving the status packet at the first node, the data packets that were not successfully received at the second node are retransmitted from the first node to the second node in response to receiving the status packet.

19 Claims, 9 Drawing Sheets

(51) Int. Cl.
*H04L 1/00* (2006.01)
*H04L 12/26* (2006.01)
*H04L 1/18* (2006.01)
*G08C 25/02* (2006.01)
*H04L 1/16* (2006.01)

(56) References Cited

U.S. PATENT DOCUMENTS

| | | | |
|---|---|---|---|
| 6,438,141 B1 | 8/2002 | Hanko et al. | |
| 6,643,612 B1* | 11/2003 | Lahat et al. | 702/186 |
| 2003/0115338 A1* | 6/2003 | Jayam et al. | 709/228 |
| 2003/0126238 A1 | 7/2003 | Kohno et al. | |
| 2004/0047300 A1 | 3/2004 | Enomoto et al. | |
| 2004/0233844 A1* | 11/2004 | Yu et al. | 370/230 |
| 2006/0039283 A1 | 2/2006 | Sturrock et al. | |
| 2006/0120405 A1 | 6/2006 | Engbersen | |
| 2007/0230337 A1 | 10/2007 | Igarashi et al. | |
| 2007/0274342 A1 | 11/2007 | Kim et al. | |
| 2008/0256272 A1 | 10/2008 | Kampmann et al. | |
| 2009/0201885 A1 | 8/2009 | Kuroda et al. | |

OTHER PUBLICATIONS

"Reliable User Datagram Protocol", retrieved from internet site: http://en.wikipedia.org/w/index.php? title=Reliable_User_Datagram_Protocol&printable=yes on Jun. 15, 2009, 1 page. 3.
"Real-time transport Protocol", retrieved from internet site: http://en.wikipedia.org/w/index.php?title=Realtime_Transport_Protocol &printable=yes on Jun. 15, 2009, 6 pages.
"RTP Control Protocol", retrieved from internet site: http://en.wikipedia.org/w/index.php? title=RTP_Control_Protocol &printable=yes on Jun. 15, 2009, 3 pages.
Paul, K. K. Sabnani, et al. Reliable Multicase Transport Protocol (RMPT) S, IEEE Journal on SWelected Areas in Communications, vol. 15, No. 3, Apr. 1997, pp. 407-421.
USPTO "Non-Final Office Action" mailed Aug. 4, 2010; U.S. Appl. No. 12/404,920, filed Mar. 16, 2009.
USPTO "Non-Final Office Action" mailed Jan. 21, 2011; U.S. Appl. No. 12/404,920, filed Mar. 16, 2009.
USPTO "Final Office Action" mailed Jul. 12, 2011; U.S. Appl. No. 12/404,920, filed Mar. 16, 2009.
USPTO "Notice of Allowance" mailed Jan. 9, 2012; U.S. Appl. No. 12/404,920, filed Mar. 16, 2009.

* cited by examiner

| VERSION (2 BITS) 560 | PADDING (1 BIT) 562 | EXTEN. (1 BIT) 564 | RESERVED (5 BITS) 566 | PAYLOAD TYPE (7 BITS) 568 | SEQUENCE NUMBER (2 BYTES) 570 |
|---|---|---|---|---|---|
| TIMESTAMP (4 BYTES) 572 ||||||
| SESSION IDENTIFIER (4 BYTES) 574 ||||||
| RECEIVER BUFFER FILLED % (1 BYTE) 576 || RECEIVER BUFFER COUNT (1 BYTE) 578 ||| HIGHEST CORRECT SEQUENCE NUMBER (4 BYTES) 584 |
| EXTENSION LENGTH (1 BYTE) 580 ||| BITMASK (1 BYTE) 582 || ENDING SEQUENCE NUMBER (2 BYTES) 588 |
| STARTING SEQUENCE NUMBER (2 BYTES) 586 ||||| LOST PACKET BITMAP (2 BYTES) 592(1) |
| LOST PACKET IDENTIFIER (2 BYTES) 590(1) ||||| LOST PACKET BITMAP (2 BYTES) 592(2) |
| LOST PACKET IDENTIFIER (2 BYTES) 590(2) ||||| ... |
| ... ||||| |
| LOST PACKET IDENTIFIER (2 BYTES) 590(N) ||||| LOST PACKET BITMAP (2 BYTES) 592(N) |

STATUS (NACK/ACK) PACKET HEADER 514

FIG. 5C

METHOD AND NODE FOR TRANSMITTING DATA OVER A COMMUNICATION NETWORK USING NEGATIVE ACKNOWLEDGMENT

CROSS-REFERENCES TO RELATED APPLICATIONS

This Application claims priority to U.S. Non-Provisional application Ser. No. 12/404,920, filed Mar. 16, 2009.

BACKGROUND

The Internet has become an important, and often critical, communication network for transporting data of many kinds, including textual, audio, and visual data, between distinct nodes of the network. The transfer of this data within the Internet is facilitated by a "stack" of architectural "layers", with each layer providing a corresponding type of functionality required of the network to transport the data. Each of these layers at least roughly corresponds to one or more of the seven layers of the Open Systems Interconnection (OSI) Reference Model, which identifies seven different layers (i.e., the physical layer, the data link layer, the network layer, the transport layer, the session layer, the presentation layer, and the application layer, in ascending order), only one of which represents the actual physical network connection. The remaining layers describe the various types of data and associated control information being generated and transferred within the network.

While different portions of the Internet often utilize diverse physical and data link layers, much of the Internet employs some version of the Internet Protocol (IP) for the network layer. Above the IP layer, however, several different options exist for the transport layer. Two of the more popular options are the Transmission Control Protocol (TCP) and the User Datagram Protocol (UDP). Generally, TCP provides for logical connections to be established between two end nodes of the network for subsequent data transfer therebetween. Also, TCP provides a data packet acknowledgement, timeout, and retransmission mechanism, as well as a packet sequencing facility, to protect against data loss. Conversely, UDP does not provide an acknowledgement, timeout, or retransmission mechanism, does not explicitly facilitate data packet sequencing, and does not establish a logical connection between two communicating network nodes. Accordingly, due to its lower overhead, UDP is often utilized in situations in which data loss is less important than any additional delay that may be incurred by using TCP for data packet transmission. Oppositely, TCP is typically employed in scenarios in which data reliability and integrity are important considerations.

Many network-connected computer systems provide a software "sockets" application programming interface (API) to allow software applications executing on the system to employ UDP, TCP, and other types of transport layers to communicate with other nodes on the network. One such API is the Berkeley Software Distribution (BSD) Sockets API, which provides a number of functions that may be called by applications to create and terminate connections over a network with another node, exchange data over such connections, and perform related activities using TCP, UDP, or another transport layer implementation.

While the use of TCP, UDP, the BSD sockets API, and other typical implementations of the various architectural layers of the Internet is widely accepted, utilization of these standard communication tools by two communication network nodes may not adequately address some specific data characteristics, network environments, and other concerns.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 5C is a graphical representation of a header for a status packet indicating positive and/or negative acknowledgment of a previously transmitted data packet according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
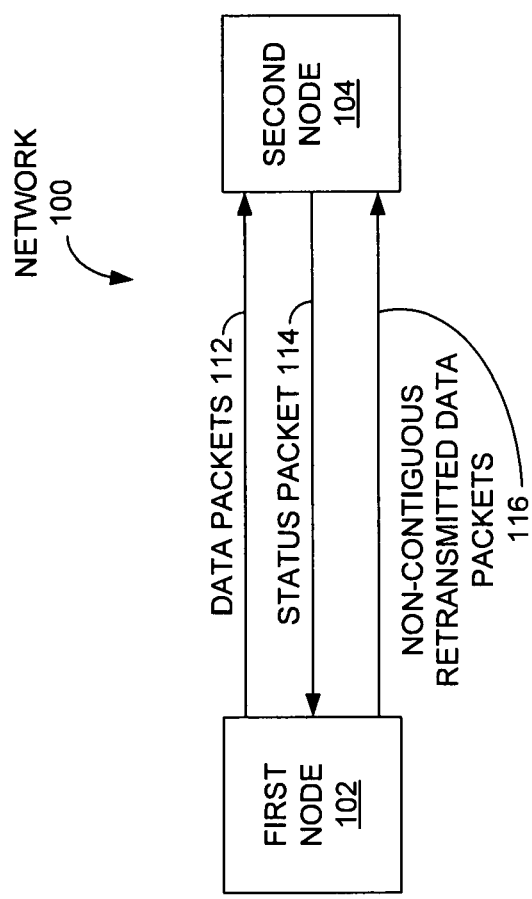
FIG. 1 is a simplified block diagram of two nodes of a communication network according to an embodiment of the invention.

FIG. 1 is a simplified block diagram of a communication network 100 in which a first node 102 and a second node 104 may transmit and/or receive data packets therebetween. The network 100 may be any communication network over which digital data may be carried or transferred, including a local area network (LAN), or a wide area network (WAN), such as the Internet. While FIG. 2 implies a direct coupling between the nodes 102, 104, other communication devices, such as routers, switches, firewalls, and the like, may be employed to communicatively couple the nodes 102, 104 together in various arrangements. Further, the digital data being transmitted and received may include video data, audio data, textual data, numeric data, or any other form of digital data.

Figure 2:
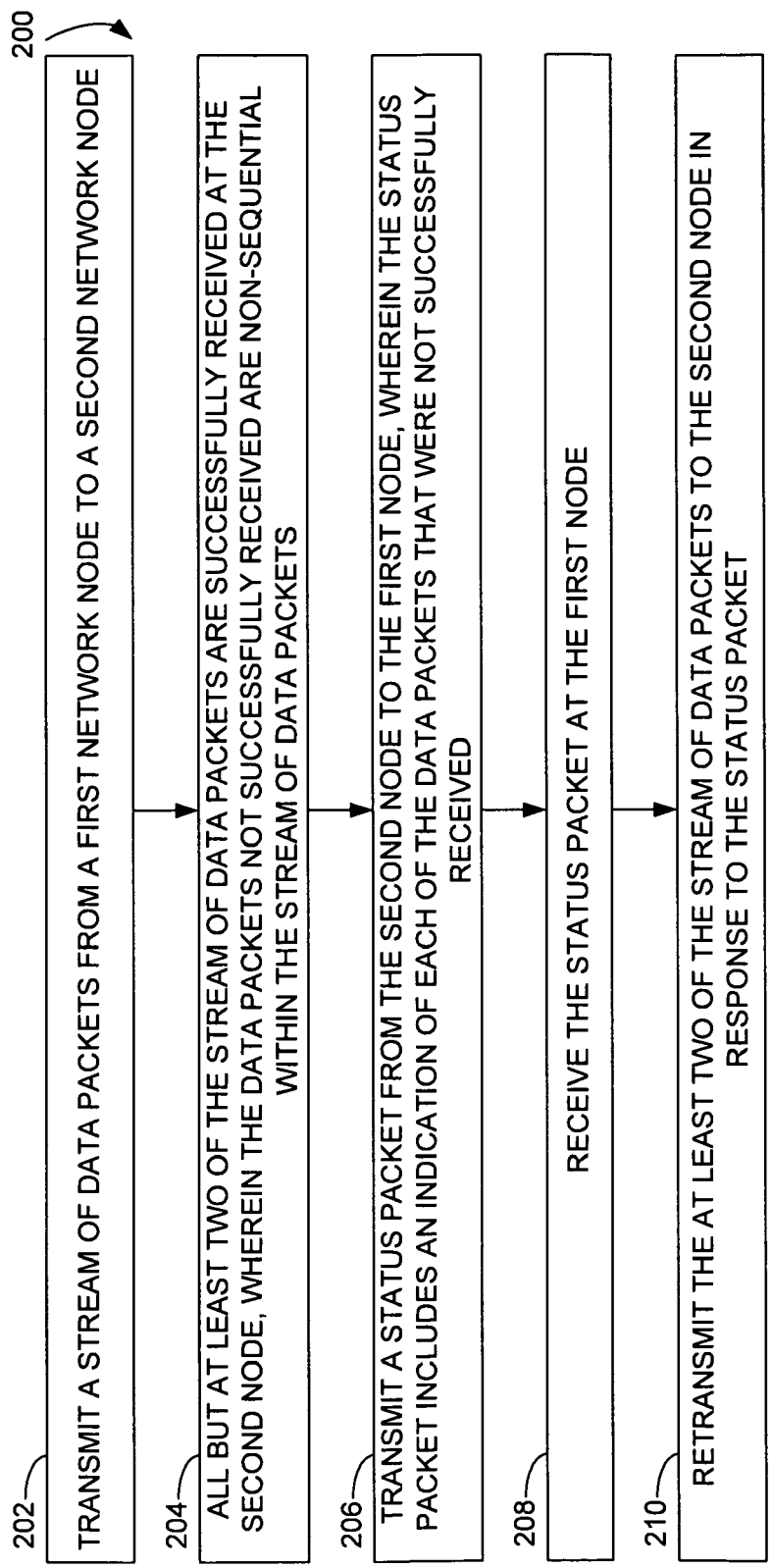
FIG. 2 is a flow diagram of a method according to an embodiment of the invention for transmitting data over a communication network between the nodes of FIG. 1 while employing negative acknowledgment.

FIG. 2 provides a flow diagram of a method 200 according to an embodiment of the invention for transmitting data between the first node 102 and the second node 104 using a negative acknowledgment scheme. In the method 200, a stream of data packets 112 is transmitted from the first node 102 to the second node 104 (operation 202). All but at least two of the stream of data packets 112 are then successfully received at the second node 104 (operation 204). The data packets 112 not successfully received at the second node 104 are non-sequential within the stream of data packets 112. For example, the stream of data packets 112 may include one hundred data packets 112, of which the twenty-first data packet 112 and the thirty-fifth data packet 112 are not received successfully at the second node 104. In one embodiment, a data packet 112 that is not successfully received at the second node 104 may be a data packet 112 that is never received, or is received but includes uncorrectable or unrecoverable errors. A status packet 114 is then transmitted from the second node 104 to the first node 102, wherein the status packet 114 includes an indication of each of the data packets of the stream of data packets 112 that were not successfully received (operation 206). In one embodiment, the status packet 114 may also include an indication of at least one of the stream of data packet 112 that was successfully received at the second node 104. After receiving the status packet 114 (operation 208), the at least two of the stream of data packets 112 are retransmitted from the first node 102 to the second node 104 (operation 210). In another embodiment, a computer-readable storage medium may have encoded thereon instructions for a processor or other control circuitry to direct a device to implement the method 200.

While the embodiments of FIGS. 1 and 2 depict the data packets 112 being transferred solely from the first node 102 to the second node 104, data transmissions between the nodes 102, 104 may occur from the second node 104 to the first node 104 as well, resulting in bidirectional or duplex communication between the nodes 102, 104.

Use of the method 200 allows the second node 104 to report to the first node 102 the identity of non-sequential packets 112 that were not received successfully from the first node 102 in a single status packet 114. Further, the method 200 allows the second node 102 to negatively acknowledge multiple unsuccessful data packets 112, whether or not sequentially positioned or forming a contiguous group of the stream of data packets 112 being transferred from the first node 102. Thus, fewer status packets are required to be transferred from the second node 104 to the first node 102, while the first node 102 receives information regarding the success of the data packet 112 transmissions in a timelier manner than with a standard acknowledgement scheme.

Figure 3:
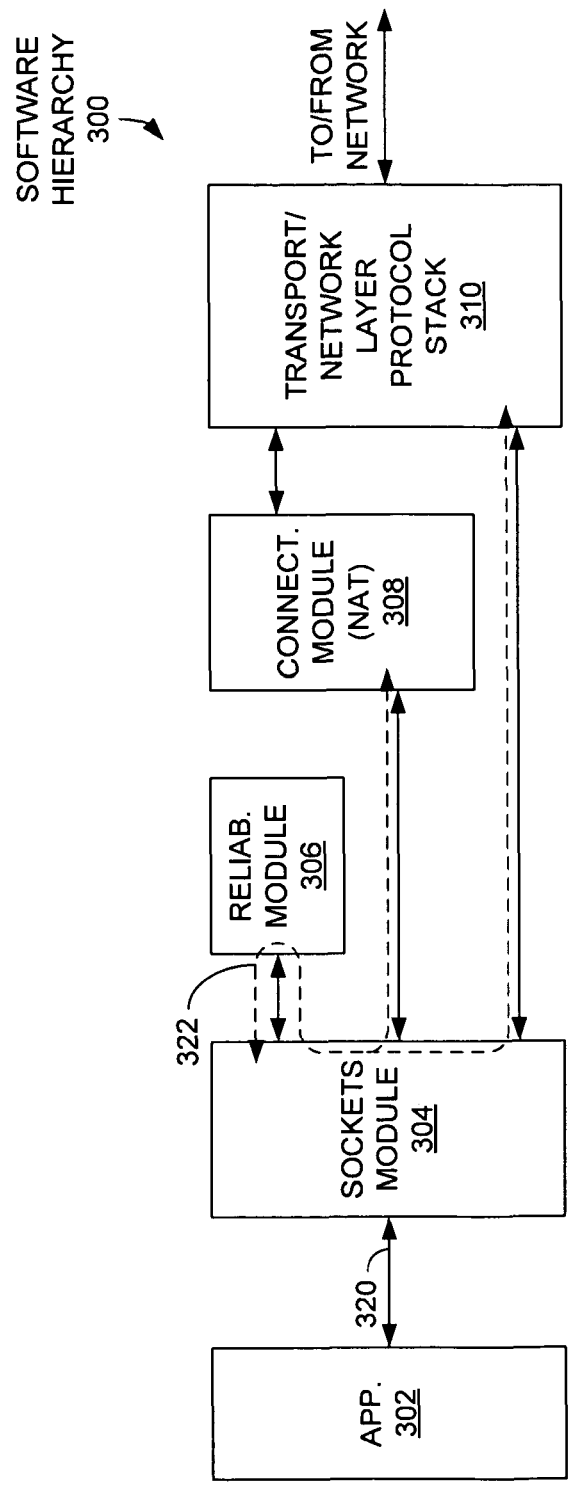
FIG. 3 is a block diagram of a communication software module hierarchy for a network node according to an embodiment of the invention for engaging in communications with another network node.

FIG. 3 is a block diagram of a particular communication software module hierarchy 300 that may be implemented within a network node, such as either of the nodes 102, 104 of FIG. 1. The hierarchy 300, when implemented within each of two network nodes, facilitates the transmission of data packets between the nodes while employing a negative acknowledgment scheme, such as the one described above. While the following discussion focuses on the specific hierarchy 300 of FIG. 3 as a software platform by which these data transmissions may occur, other software architectural configurations may be employed to similar effect in other implementations.

The software hierarchy 300 includes an application 302, a "sockets" module 304, a reliability module 306, a connectivity module 308, and a transport/network layer protocol stack 310, such as a TCP/IP stack, including support for a connectionless transport layer protocol, such as UDP. The application 302 may be any application-level software requiring access to a communication network. In one specific implementation, the application 302 may be an audio/video stream source and/or display application, thus necessitating access to the communication network for the transmission and/or reception of audio/video data. For example, an audio/video destination, such as a computer system, a personal digital assistant (PDA), or a mobile communication device, may attempt to establish a communication connection with a video source node, such as a Slingbox by Sling Media, Inc., coupled to a satellite or cable set-top box, so that the destination node may stream video from the set-top box via the source node over the network. In this case, the source node may be viewed as a server node, while the destination node may be regarded as a client node, with both the server node and the client node each separately implementing the software hierarchy 300 of FIG. 3.

The sockets module 304 provides an application programming interface (API) through which the application 302 of the client or server device may access the network, including the establishment of connections and transfer of data over such connections. Such an interface is often facilitated by way of a set of function calls provided by the sockets module 304. Generally, a "socket" is an endpoint of a communication path through the network defined by a node address (such as an IP address) and a port number. The sockets module 304 allows the application 302 to create one or more such sockets, request a connection to another node using the socket, transmit and/or receive data via the socket, free the socket, and other applicable tasks. One example of the sockets module 304 is discussed in U.S. Patent Publication No. 20100232438 A1, entitled "Method and Node for Employing Network Connections over a Connectionless Transport Layer Protocol", filed Mar. 16, 2009, which is hereby incorporated by reference herein in its entirety.

The sockets module 304 accesses the reliability module 306 to facilitate various protection mechanisms for the user data being transferred over an established connection between network nodes. In one implementation, such mechanisms may include, but are not limited to, sequencing of the user data packets to facilitate their proper ordering at the receiving node, acknowledgment (or non-acknowledgment) and retransmission of lost user data packets, and other functionality not provided by a connectionless transport layer protocol, such as UDP. Further, the reliability module 306 may implement such protections as a replacement for the standard TCP layer. Software involving data transmissions which employ negative acknowledgment of unsuccessful data packets, as mentioned in the above embodiments and discussed in greater detail below, provide an example of the reliability module 306 of FIG. 3.

As shown in FIG. 3, the sockets module 304 may further interface with a connection module 308, which may facilitate the creation of "tunnels" or other mechanisms for maintaining a viable communication path between two network nodes.

The sockets module 304 also communicates with the standardized transport/network protocol stack 310, such as a TCP/IP stack which incorporates a connectionless transport layer protocol, such as UDP. The sockets module 304 employs the UDP portion of the TCP/IP stack, thus circumventing TCP. Also, sequencing and retransmission capabilities supplied by the reliability module 306 may also be implemented in lieu of the corresponding functionality normally provided in TCP. Thus, the functionality provided by the sockets module 304, the reliability module 306, and the connectivity module 308 may be tailored to address various aspects of specific communication environments more efficiently than that provided by TCP.

As shown in FIG. 3, the application 302 communicates with the sockets module 304 by way of function calls 320 without having to engage in the specific details of the other modules 306, 308, 310 provided in the software hierarchy 300. In turn, the sockets module 304 handles the required communications with the other modules 306, 308, 310, primarily in response to the function calls 320. In one implementation, a general control path 322 between the sockets module 304 and the reliability module 306, as well as between the sockets module 304 and each of the connectivity module 308 and the protocol stack 310, allows the sockets module 304 to control each resulting protocol layer involved in network communications with another node.

Figure 4:
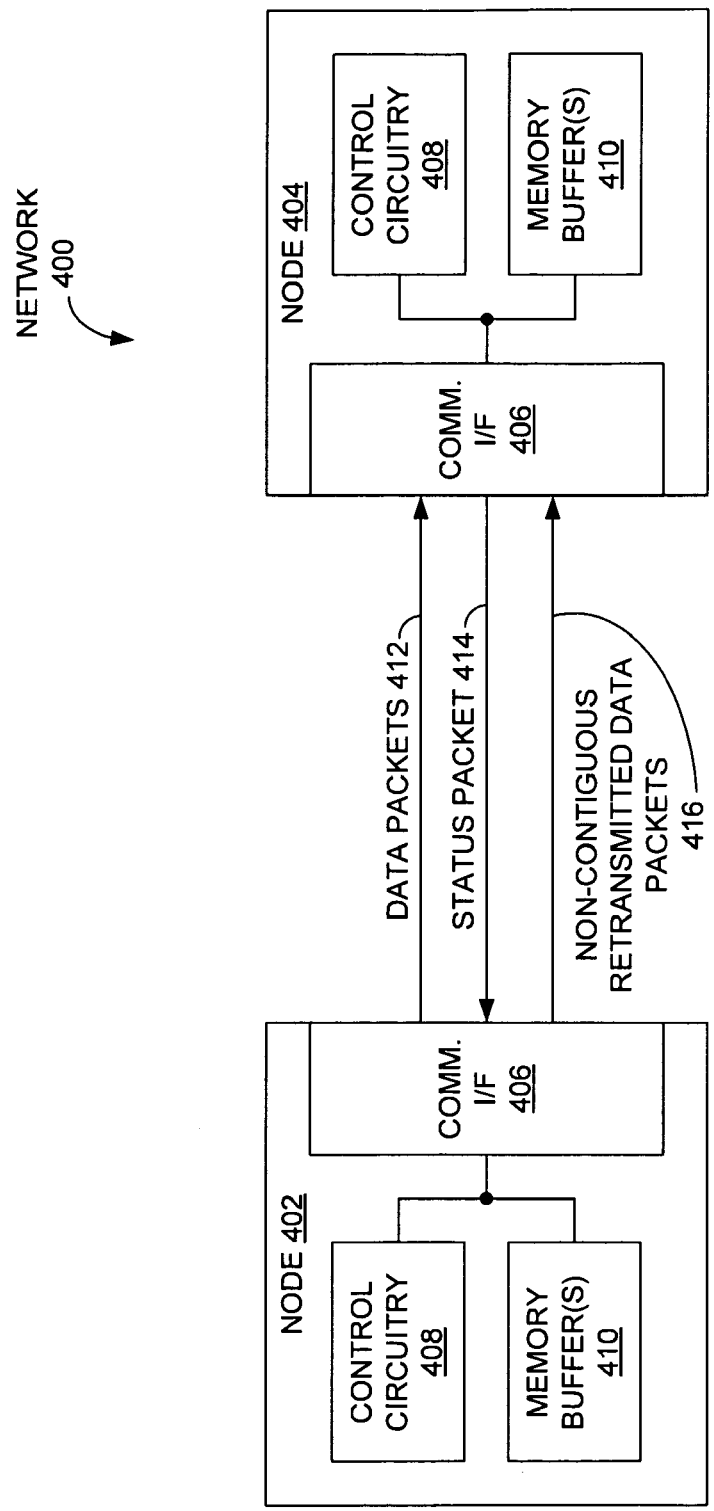
FIG. 4 is a simplified block diagram of two nodes of a communication network according to another embodiment of the invention.

FIG. 4 provides a simplified block diagram of a network 400 employing two nodes 402, 404 according to an embodiment of the invention, wherein the first node 402 acts as a sending node 402, while the second node 404 serves as a receiving node 404. In other implementations, the roles of the nodes 402, 404 may be reversed, or both nodes 402, 404 may serve as both sending and receiving nodes. Each node 402, 404 includes a communication interface 406, control circuitry 408, and one or more memory buffers 410.

The communication interface 406 is configured to transmit and receive data packets with the other node 402, 404 of the network 400. In one example, the communication interface 406 is an interface configured to communicate over an IP network implemented over a wired or wireless link/physical layer. Examples of such layers include Ethernet, Wi-Fi (e.g., IEEE 802.11a/b/g/n), digital subscriber line (DSL), cable modem, and others. Also, network layers other than IP may be employed in other arrangements. The communication interface 406 may be implemented as a network interface card (NIC), circuitry located on a computer system motherboard, or via other circuit means.

The control circuitry 408 is configured to generate and transmit data packets 412, 416 and status packets 414 via the communication interface 406 to one or more other nodes 402, 404, as well as to receive and process data packets 412, 416, and status packets 414 from those nodes 402, 404 by way of the interface 406. The structure and use of those packets 412, 414, 416 are discussed in greater detail below. The control circuitry 408 may include one or more processors, such as a microprocessor, microcontroller, or digital signal processor (DSP), configured to execute instructions directing the processor to perform the functions and facilitate the communication discussed in greater detail below. The control circuitry 408 may also include memory or data storage adapted to contain such instructions. In another implementation, the control circuitry 408 may be strictly hardware-based logic, or may include a combination of hardware, firmware, and/or software elements.

Also possibly included in each of the nodes 402, 404 are one or more memory buffers 410 configured to store data packets, such as the original data packets 412 and the retransmitted data packets 416. In the case of the sending node 402, the memory buffers 410 may store data packets 412, 416 that are either awaiting to be transferred to the second node 404, or have been already transferred and are awaiting subsequent acknowledgment from the second node 404. In the case of the receiving node 404, the memory buffers 410 may include data packets 412, 416 that have been received from the first node 402. In one particular implementation, each of the buffers 410 may include a single data packet 412, 416, thus allowing a buffer 410 to be freed for storing another data packet 412, 416 when the data packet 412, 416 currently stored in the buffer 410 is no longer needed.

Figure 5A:
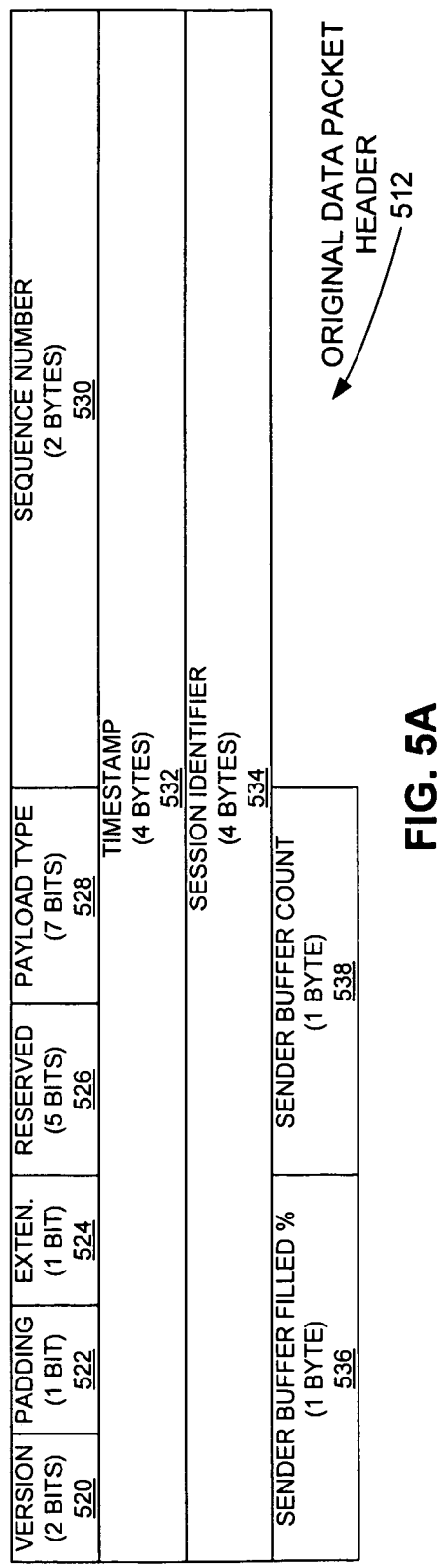
FIG. 5A is graphical representation of a header for an original data packet to be transmitted over a network according to an embodiment of the invention.
Figure 5B:
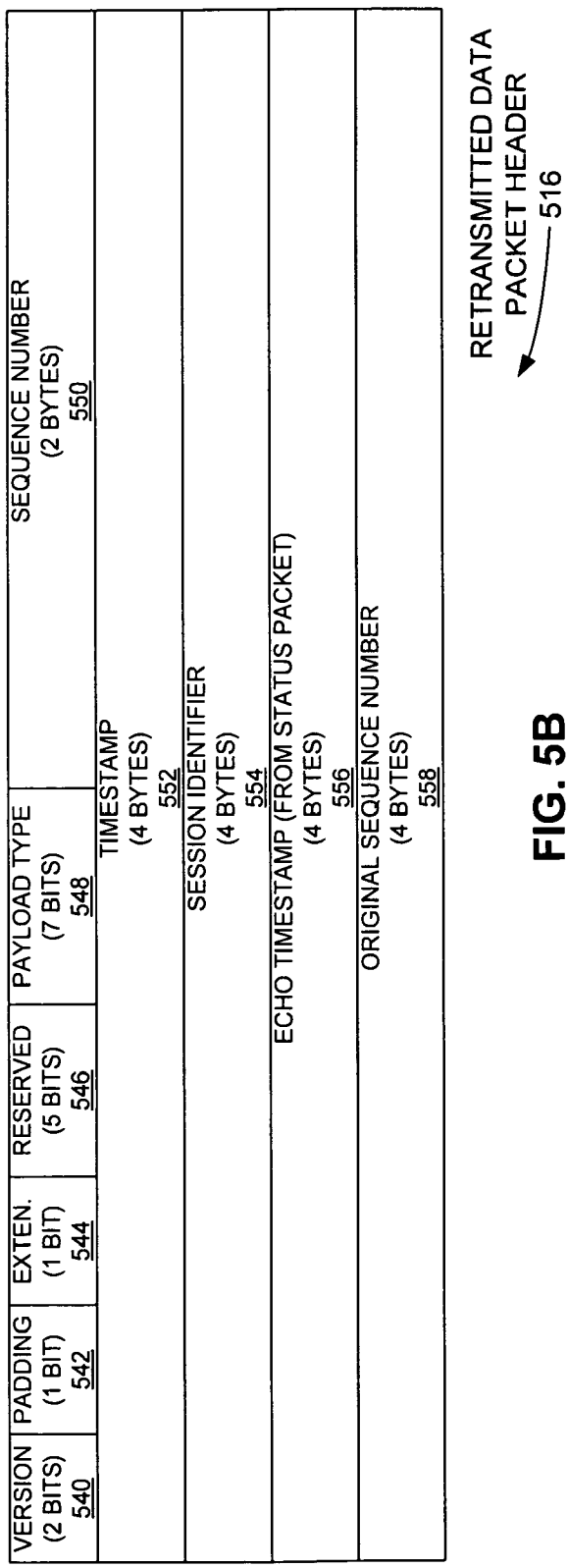
FIG. 5B is a graphical representation of a header for a data packet to be retransmitted over a network according to an embodiment of the invention.

FIGS. 5A, 5B, and 5C provide graphical representations of three different possible types of packet "headers" included in the data packets 412, 416 and the status packets 414 being transferred between the two network nodes 402, 404. Generally, a packet header includes control and/or status information related to the rest of the packet, and is typically positioned at the front of the packet, although other locations within the packet are also possible. Within the environment of the software hierarchy 300 of FIG. 3, the headers of FIGS. 5A, 5B, and 5C are generated by the reliability module 306, possibly added to user data, such as audio/video data, and then transferred to the sockets module 304, which in turn forwards the resulting packets to the transport/network layer protocol stack 310, before being transmitted to another network node. As a result, one or more other protocol headers, such as a sockets layer header at the sockets module 304, and a UDP header at the transport/network layer 310, may be added to the packets as they progress through the hierarchy 300. In one example, the data packets 412, 416 may be transferred from the sockets module 304 to the connectivity module 308 before being passed to the transport/network layer 310. While the discussion of FIGS. 5A, 5B, and 5C focus on specific information contained in the headers described below, other forms of headers other than those specifically illustrated in FIGS. 5A, 5B, and 5C may be employed in other implementations.

FIG. 5A depicts a possible header 512 for an original data packet 412. The original data packet header 512 includes a number of fields, each of which provides a specific type of information or facilitates a particular function. The fields of the original packet 512 include a version 520, a padding bit 522, an extension bit 524, a reserved field 526, a payload type 528, a sequence number 530, a timestamp 532, a session identifier 534, a sender buffer filled percentage 536, and a sender buffer count 538. The user or payload data of the original data packet typically follows the header 512.

The version 520 indicates the version of the protocol employed in the current header 512 so that the remainder of the header 512 may be properly interpreted, thus allowing future changes to the format while allowing backward compatible to older format versions.

The padding bit 522 indicates whether the payload data of the original packet 412 is "padded" at the trailing end with data that does not constitute payload data. Such padding is often used to ensure that all of the original packets 412 are of the same length, regardless of the length of the payload data in any particular packet 412. In another example, the padding may be utilized to ensure that the length of each data packet 412 is a multiple of some value, such as four. In one embodiment, when the padding bit 522 is set, the last byte, word, octet, or other subdivision of the padding data includes an indication of the amount of the packet data is padding, and may thus be ignored at the receiving node 404.

The extension bit 524, when set, indicates whether the header 512 includes a header extension appended to the end of the normal header. In one embodiment, the header bit 524 is cleared for all original data packets 412 and retransmitted data packets 416, thus indicating that no header extension is included in the data packets 412, 416.

The reserved field 526 is a portion of the header 512 reserved for use in future versions of the header 512 protocol. In one embodiment, the reserved field 526 may include all zeros.

The payload type 528 may indicate that the payload data of the original data packet 412 is of, or is associated with, a particular type of data. In one example, the payload type 528 indicates whether the current packet is a data packet (such as an original data packet 412 or a retransmitted data packet 416) or a status packet 414 of FIG. 4. In this case, the payload type 528 indicates whether or not payload or user data is included in the packet, as status packets 414 may not ordinarily carry substantive payload data.

The sequence number 530 is a number distinguishing the current data packet 412 from other data packets 412 sent by the same node 402. In one example, the sequence number 530 of the first packet is zero, and is incremented by one for each subsequent packet transmitted by the node 402. As is described below, the second node 404 receiving data packets 412 may employ the sequence number 530 to indicate which of the stream of data packets 412 have been successfully received, and which must be retransmitted by the first node 402.

The timestamp 532 indicates a time at which the current packet was transmitted by the first node 402. In one example, the timestamp 532 indicates a time with a precision on the order of milliseconds as generated by a system clock. Further, the timestamp 532 may represent a monotonic, linearly-increasing time value. In some embodiments, as described in greater detail below, the timestamp 532 may be employed to determine "jitter" (i.e., the variable amount of delay the data packets 412, 416 may incur as they traverse the network 400). In the case of a status packet 414, a similar timestamp 572 shown in FIG. 5C may help determine roundtrip time from the standpoint of the second node 404 (i.e., the time from the transmission of a status packet 414 from the second node 404 to the receipt of an associated retransmitted data packet 416 at the second node 404). Calculation of this roundtrip time is discussed more fully below.

The session identifier 534 may indicate the source (transmitting) node 402 of the current packet 412. In one example, the session identifier 534 is randomly chosen so that different source nodes 402, 404 are likely to generate different session identifiers 534. In another example, the session identifier 534 may further distinguish between different sessions or different streams of data packets 412 being transferred to one or more other nodes 402, 404 over the network 100. In one example, data packets 412 of an older session received at the second node 404 may be ignored in favor of data packets 412 associated with a current session from the first node 402. In yet another implementation, the source node 402 may apply different session identifiers 534 to original data packets 412 and retransmitted data packets 416 so that the second node 404 may more easily distinguish between the two.

The sender buffer filled percentage 536 and the sender buffer count 538 together indicate the current status of memory buffers 410 of the source node 402 of the current data packet 412. More specifically, the sender buffer count 538 may indicate the total number of buffers 410 employed in the source node 402 to hold the data packets 412. The sender buffer filled percentage 536 may indicate the current percentage of the buffers 410 holding data packets 412 awaiting to be transmitted to, and/or be acknowledged by, the second node 404. Thus, the combination of the sender buffer filled percentage 536 and the sender buffer count 538 may indicate the number of buffers 406 awaiting transmission and acknowledgment before being freed for a subsequent data packet 412.

In one implementation, only the sender buffer filled percentage 536 may be employed to make that determination. In another example, a sender buffer filled number may be employed in lieu of the sender buffer filled percentage 536 to reflect similar information regarding the source buffers 410. The second node 404, as recipient of this information, may use the information to determine how often data packets 412, 416 should be positively and/or negatively acknowledged to allow the first node 402 to free its buffers 410 to allow newer data packets 412, 416 to be loaded into the buffers 410.

FIG. 5B illustrates the header 516 for a retransmitted data packet 416 of FIG. 4. Similar to the original data packet header 512, the retransmitted data packet header 516 employs a version field 540, a padding bit 542, an extension bit 544, a reserved field 546, a payload type 548, a sequence number 550, a timestamp 552, and a session identifier 554. Each of these fields 540-554 provide information identical or similar to the fields 520-534 of the original data packet header 512 described above. In one specific example, the payload type 528, 548 of both original data packets 412 and retransmitted data packets 416 may exhibit the same value to indicate that both types of packets 412, 416 carry user or payload data. In another case, the session identifier 554 used in the retransmitted data packets 416 may be different from that the session identifier 534 of the original data packets 412 to distinguish the two types of data packets 412, 416 at the second node 404.

A sender buffer filled percentage field and a sender buffer count, such as the sender buffer filled percentage field 536 and the sender buffer count 538 of the original data packet header 512, are not employed in the specific retransmitted data packet header 516 of FIG. 5B, although such fields providing the same information may be incorporated into other implementations.

Two additional fields provided in the retransmitted data packet header 516 are an echo timestamp 556 and an original sequence number 558. The echo timestamp 556 is a copy of a timestamp 572 provided in a status packet 516, shown in FIG. 5C, and described more fully below. More specifically, a retransmitted data packet 416 carrying payload data of a data packet 412 negatively acknowledged in a status packet 414 carries an echo timestamp 556 from the header 514 of that status packet 414. The echo timestamp 556 is used in one embodiment to determine a roundtrip time from the moment a status packet 414 is transmitted to the first node 402 until a retransmitted data packet 416 negatively acknowledged in the status packet 414 is received at the second node 404. Calculation of the roundtrip time is discussed in greater detail below in conjunction with FIG. 6.

The original sequence number 558 is a copy of the sequence number 530 of the original data packet 412 whose payload data is carried in the current retransmitted data packet 416. The original sequence number 558 thus facilitates identification of the retransmitted data packet 416 with its corresponding original data packet 412 at the second (receiving) node 404.

FIG. 5C depicts a header 514 for a status packet 414. In one embodiment, the status packet 414 may act as an acknowledgment packet (affirming the successfully receipt of one or more original data packets 412 or retransmitted data packets 416), a non-acknowledgment packet, or a combined acknowledgment/non-acknowledgment packet, each of which may refer to multiple data packets 412, 416 forming contiguous or noncontiguous blocks of data.

The status packet header 514 provides a number of fields similar to corresponding fields of the original data packet header 512. More specifically, the status packet header 514 of FIG. 5C includes a version field 560, a padding bit 562, an extension bit 564, a reserved field 566, a payload type 568, a sequence number 570, a timestamp 572, and a session identifier 574, each of which provide similar information as the corresponding fields 520-534 of the original data packet header 512.

Also provided in the status packet header 514 are a receiver buffer filled percentage 576 and a receiver buffer count 578, reflecting information analogous to the sender buffer-related information fields 536, 538 of the original data packet header 512. However, the receiver buffer filled percentage 576 and the receiver buffer count 578 apply to memory buffers 410 of a node receiving data packets 412, 416, such as the second node 404 of FIG. 4. In one embodiment, the first node 402 may employ this information to alter the transmission rate of the data packets 412, 416 to the second node 404, as is described in greater detail below.

The status packet header 514 of FIG. 5C also provides an extended header, as exhibited by fields 580-592. The existence of this extended header may be noted in the extension bit 564 of the header 514. Further, an extension length 580 may indicate how many bytes are included in the extended header. In another implementation, the extension bit 564 may not be set unless additional header information is added beyond the fields 580-592 depicted in FIG. 5C. In addition, a bitmask 582 may indicate which of the following fields 584-592 in the extended header are present and/or valid.

The status packet header 514 may include a highest correct sequence number 584, which would indicate the highest sequence number of a contiguous block of data packets 412, 416 transmitted by the first node 402 that have been successfully received by the second node 404. In other words, for a particular sequence number noted in the highest correct sequence number 584, all packets having a sequence number less than or equal to that sequence number have been or are being positively acknowledged in the current status packet 414.

Also possibly included in the status packet header 514 are a starting sequence number 586 and an ending sequence number 588, which reflect a range of sequence numbers for data packets 412, 416 for which the current status packet 414 is acknowledging as being successfully received at the second node 404, with the exception of any lost packets specified in a list following the starting sequence number 586 and the ending sequence number 588 in the header 514.

In FIG. 5C, the list of lost packets being negatively acknowledged in the status packet header 514 may include a number of entries, with each entry including a lost packet identifier 590 and a lost packet bitmap 592. Each lost packet identifier 590 includes the sequence number of an original data packet 412 or a retransmitted data packet 416, as shown in the sequence number field 530 of the original data packet 512, or in the original sequence number 558 of a retransmitted data packet header 516. In one embodiment, each lost packet 412, 416 being negatively acknowledged may be identified in such a manner. In another embodiment, closely located groups of lost data packets 412, 416 may be identified by indicating a first of the lost packets 412 in a lost packet identifier 590, and then indicating the relative position of one or more other lost packets in the corresponding lost packet bitmap 592.

In one example, in order for a status packet 414 to negatively acknowledge the loss of data packets 412, 416 having sequence numbers N, N+2, N+4, and N+8 through N+11, the status packet header 514 may identify the sequence number N in a lost packet identifier 590. Further, the remaining sequence numbers may be identified by way of a binary value of 01010001-11100000 in the associated lost packet bitmap 592, in which each set bit position of the bitmap 592 (indicated by a '1' in the binary value) identifies an offset of the remaining lost packets 412, 416 from the first lost packet 412, 416 noted in the associated lost packet identifier 590.

As a result, by the use of the various fields 584-592 of the extended portion of a single status packet header 514, any number of data packets 412, 416 may be positively or negatively acknowledged, thus reducing the amount of traffic of status packets 414 from the second node 404 to the first node 402 compared to typical acknowledgment schemes. Further, the use of the lost packet bitmaps 592 facilitates negative acknowledgment of numerous packets located closely together, thus being particularly suited for communication environments in which burst data packet errors are expected.

In operation, the first node 402 of the network 400 of FIG. 4 may transmit a stream of original data packets 412 to the second node 402. In response, the second node 404 may transmit status packets 414 to the first node 402 from time to time, positively and/or negatively acknowledging one or more of the original data packets 412. In response to those packets 412 that were negatively acknowledged, the first node 402 may attempt to retransmit those data packets 412 as retransmitted data packets 416 to the second node 404.

The first node 402 may transfer original data packets 412 to the second node 404 under a variety of circumstances. For example, the first node 402 may initiate such a transmission when an application, such as the application 302 of FIG. 3, supplies new data for that transmission. At other times, the first node 402 may limit transmission bursts to once every predetermined period of time, such as once every few milliseconds. In another example, the first node 402 may transmit original data packets 412 and or retransmitted data packets 416 whenever a status packet 414 is received from the second node 404.

The first node 402 may also control the rate of transmission of the data packets 412, 416 to the second node 404 by maximizing data flow while minimizing the chance of an overflow condition at the second node 404. In one implementation, the first node 402 may control the transmission rate based on an estimated bandwidth of a connection between the first node 402 and the second node 404. This estimated bandwidth may be based upon information received by the first node 402 in the status packets 414 from the second node 404. For example, the first node 402 may calculate a packet loss percentage based upon the relative number of data packets 412 being positively and/or negatively acknowledged by the second node 404. Thus, the estimated bandwidth may first be set to some default value, and then altered as information from the returning status packets 414 is received and processed. This information may be calculated periodically based on a static time period, or based upon a roundtrip time measured from the perspective of the first node 402.

In one example, if the calculated packet loss percentage is less than a specific value, such as 5%, the first node 402 may increase the estimated bandwidth, such as by a percentage of the current actual transmission rate of the data packets 412. An example of such a percentage may be 5%. Otherwise, the new estimated bandwidth value may be decreased, such as to a mean value of the current estimated bandwidth and the current actual transmission rate. In a further implementation, if the first node 402 has increased the estimated bandwidth some number of consecutive times, the first node 402 may aggressively increase the estimated bandwidth further by a higher percentage (such as 10%) of the current actual transmission rate. In another embodiment, minimum and maximum estimated bandwidth values may also be employed.

The first node 402 may also control the flow or rate of the transmissions based on the receiver buffer filled percentage 576 and the receiver buffer count 578 values of the header 514 of the status packets 414 being received from the second node 404. Generally, the first node 402 will stop or reduce the transmissions if the header fields 576, 578 indicate that the memory buffers 410 of the second node 404 are approaching a full state. In one embodiment, the first node 402 may be configured to transmit the data packets 412, 416 at a more aggressive rate than what may be indicated by the state of the memory buffers 410 in the second node 404. Use of this embodiment may be particularly appropriate in cases in which a roundtrip time as calculated at the first node 402 exceeds some level, such as 200 milliseconds. With longer roundtrip times, the first node 402 may presume that the memory buffers 410 in the second node 404 are emptier than indicated via the receiver buffer filled percentage 576 since many of the data packets 412, 416 being transmitted would have already been consumed by the application 302 in the second node 404, with the corresponding status packets 414 acknowledging receipt of those data packets 412, 416 remaining "in return flight" from the second node 404 to the first node 402 for a substantial period of time.

To determine the roundtrip time from the perspective of the first node 402 in one implementation, the first node 402 may track the timestamps 532 noted in the original data packets 412 being transmitted from the first node 402, and then subtract therefrom the time of arrival of the status packets 214 positively acknowledging receipt of those original data packets 412. The first node 402 may then average or otherwise process the resulting values to determine the roundtrip time from the standpoint of the first node 402, which may then be employed to determine if the aggressive data packet 412, 416 transmission rates are to be utilized.

Generally, the second node 404 may transmit a status packet 414 to positively acknowledge successfully received data packets 412, 416 in response to any of a number of conditions. In one example, the second node 404 may transmit such a status packet 414 when the first node 402 indicates that some predetermined minimum percentage (e.g., 10%) of its memory buffers 410 store data packets 412, 416 that have been transmitted and are awaiting acknowledgment. Such information may be determined in part from the sender buffer count 538 located in the header 512 of the original data packets 412 received at the second node 404. The second node 404 may then estimate the percentage by comparing the sender buffer count 538 to the highest sequence number 530 of the original data packets 412 successfully received at the second node 404 minus the highest sequence number 530 of the original data packets 412 that the second node 404 has positively acknowledged in a status packet 414. The second node 404 may also transmit status packets 414 acknowledging received data packets 412, 416 once per some predetermined period of time, such as once every 100 milliseconds.

In another embodiment, the second node 404 may periodically transmit a status packet 414 as a request for more data packets 412, which may be used when all previous data packets 412 have been positively acknowledged by the second node 404, and the flow of subsequent data packets 412 from the first node 402 has stopped. Such a circumstance may occur if the first node 402 has transmitted all available data packets 412, resulting in empty memory buffers 410 in the first node 402. The second node 404 may periodically transmit such a status packet 414 until the second node 404 receives more data packets 412. Use of the status packets 414 in this manner serves as protection against the possibility that the first node 402 has actually transmitted subsequent data packets 412 which are not received at the second node 404. Use of the status packets 414 in this fashion also aids in determining whether the connection between the first node 402 and the second node 404 is still operational. In one example, these status packets 414 indicate the sequence number 530 of last received data packet 412 as the highest correct sequence number 584 in the status packet header 514.

As indicated above, any of the status packets 414 that positively acknowledge received data packets 412, 416 may also include the identities of lost data packets 412, 416 being negatively acknowledged. In another example, the second node 404 may specifically transmit a status packet 414 negatively acknowledging a lost original data packet 412 if the timestamp 532 in the header 512 of a subsequent data packet 412 (i.e., a successful data packet 412 with a higher sequence number 530 than that of the lost data packet 412) is less than the time at which the subsequent data packet 412 is received at the second node 404 minus a measured jitter of the rate of transmissions of the data packets 412, 416 from the first node 402. In one implementation, the second node 404 may calculate the jitter using the system clock of the second node 404 and the timestamp 532 of the original data packets 412. For example, each of multiple timestamps 532 may be subtracted from the value of the system clock associated with the arrival of the original data packet 412 possessing the associated timestamp 532. The resulting values may then be averaged and/or otherwise processed to determine the jitter.

In one embodiment, the second node 404 may transmit one or more additional status packets 414 for the same lost data packet 412, 416 based on a roundtrip time measured from the standpoint of the second node 404. In one embodiment, retransmission of a negative acknowledgment of a specific data packet 412, 416 as part of a status packet 414 may occur if a retransmitted lost packet 412, 416 has not been received, and the amount of time since the previous status packet 414 negatively acknowledging the lost packet 412, 416 exceeds some predetermined time period, such as the roundtrip time determined from the perspective of the second node 404.

Figure 6:
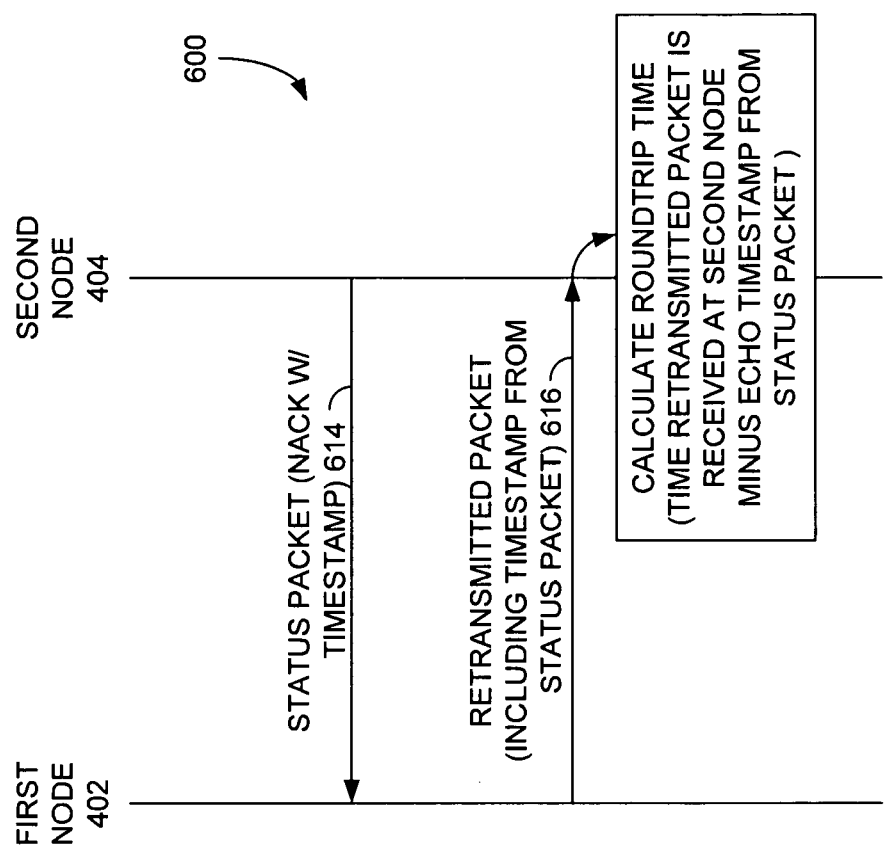
FIG. 6 is communication diagram of a packet exchange between two network nodes according to an embodiment of the invention, resulting in a calculation of roundtrip time at one of the nodes.

FIG. 6 provides a communication diagram 600 describing how the roundtrip time from the perspective of the second node (i.e., from the second node 404 to the first node 402 and back) is calculated in one embodiment. A status packet 614 is transmitted in which its header 514 includes the timestamp 572 of the time at which the status packet 414 was transmitted. The status packet 614 includes an identification of at least one lost packet. In response, the first node 402 retransmits the lost data packet as a retransmitted data packet 616, wherein its header 516 includes an echo timestamp 556, which is a copy of the timestamp 572 of the associated status packet 614. Upon receiving the retransmitted data packet 616, the second node 404 subtracts the echo timestamp 556 from the current time at which the retransmitted packet 616 is received at the second node 404. As a result, the roundtrip time generally includes the transit times of the status packet 614 and the associated retransmitted data packet 616, in addition to the time required by the first node 402 to process the status packet 614 and prepare the lost data packet 616 for retransmission.

Figure 7:
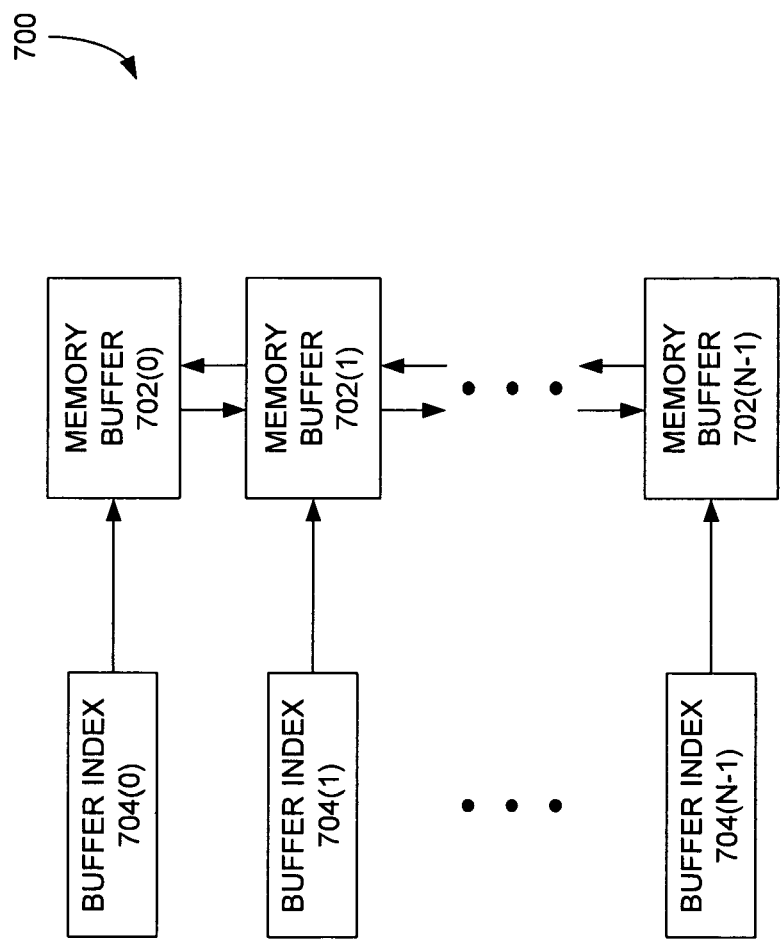
FIG. 7 is a block diagram of a set of packet buffers in a network node organized as a doubly-linked hash structure according to an embodiment of the invention.

FIG. 7 is a block diagram of a set 700 of memory buffers 702, such as the memory buffers 410 of the first node 402 and the second node 404. In this example, each of the buffers 702 includes memory for storing a single data packet 412, 416, although other implementations may allow multiple packets 412, 416 to be stored in a single buffer 702. Collectively, the memory buffers 702 may constitute a single hash structure, wherein each of the memory buffers 702 is accessed by way of an associated buffer index 704. As a result the memory buffers 702 need not be aligned within a single memory segment, nor need they reside in memory in any particular address order relative to each other.

In one implementation, the data packets 412 to be written to the memory buffers 702 are each assigned to one of the buffers 702 by way of an index number based on a hash of the sequence number 530 of the data packet header 512. For example, the index number (i.e., 0, 1, . . . , N−1) of the buffer 702 for storing a particular data particular data packet 412 may be the sequence number 530 of the data packet 412 modulo the number of buffers 702 (i.e., N). In this case, the number of memory buffers 702 may be a power of two to simplify the hashing function, as well as to efficiently handle wraparound of the sequence number from a maximum value to zero.

To facilitate deletion of data packets 412 from the memory buffers 702 once acknowledged, memory buffers 702 are configured to form a doubly-linked list so that the buffers 702 may be traversed in either ascending or descending sequence number order, deleting all acknowledged data packets 412 quickly, thus allowing the first node 402 to populate the freed buffers 702 with newer data packets 412 in advance of transmission.

At least some embodiments as described herein for transmitting data between two networks nodes using negative acknowledgment may provide a number of advantages. Overall, using negatively acknowledgement of multiple, and potentially non-sequential, lost data packets reduces the amount of status packet traffic from the receiving node to the sending node. Further, including acknowledgment of successfully received data packets in the same status packets facilitates the freeing of acknowledged data packets in buffers of the sending node, thus allowing earlier storing of newer data packets in the buffers prior to transmission, as well as reduced packet overhead. In addition, transmission of data and status packets may be based on measured data transmission characteristics passed between the sending and receiving nodes instead of on predetermined timer values, thus making the overall communication system adaptable to current transmission conditions in the network. As a result, implementation of the various aspects of the invention as discussed above may provide significant communication performance gains over more standard protocols, such as TCP, in varied communication environments, such as wired LAN, Wi-Fi, and WAN. Further advantages may be ascertained from the discussion of the embodiments presented above.

While several embodiments of the invention have been discussed herein, other implementations encompassed by the scope of the invention are possible. For example, while various embodiments have been described primarily within the context of one network node transmitting audio/video stream data to another network node, any other form of data that may be transmitted and received by nodes of a communication network, such as an IP network, may be transferred according the concepts presented herein. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method executable by a first node to transmit data over a communication network to a second node, the method comprising:

transmitting a stream of data packets from the first node to the second node via the communication network;

receiving a status packet from the second node at the first node, wherein the status packet indicates which of the stream of data packets have not yet been received at the second node; and periodically adjusting a rate at which the stream of data packets is transmitted to the second node based on an estimated bandwidth of the communication network, wherein the adjusting comprises increasing the estimated bandwidth by a percentage of the rate at which the first node transmits the stream of data packets if a loss percentage of the stream of data packets is below a predetermined level and increasing the estimated bandwidth by a second percentage of the rate at which the first node transmits the stream of data packets if the estimated bandwidth has been increased a predetermined number of consecutive times, wherein the second percentage is greater than the first percentage so that the percentage of the rate is increased during subsequent adjustments, and wherein the loss percentage is determined from information contained in the status packet.

2. The method of claim 1, wherein:
the status packet further comprises an indication of a last data packet of a contiguous plurality of the stream of data packets received successfully at the second node, wherein the contiguous plurality of data packets precedes a first of the at least two of the stream of data packets.

3. The method of claim 1, wherein:
the status packet further comprises an indication of a first data packet of a contiguous plurality of the stream of data packets, and an indication of a last data packet of a contiguous plurality of the stream of data packets;
the contiguous plurality of the stream of data packets comprises the at least two of the stream of data packets; and
those of the contiguous plurality of the stream of data packets not comprising the at least two of the stream of data packets not successfully received were received successfully at the second node.

4. The method of claim 1, wherein:
the indication of the first of the at least two of the stream of data packets comprises a sequence number of the first of the at least two of the stream of data packets.

5. The method of claim 4, wherein:
the indication of the second of the at least two of the stream of data packets identifies a number of packets that the second of the at least two of the stream of data packets follows the first of the at least two of the stream of data packets.

6. The method of claim 1, wherein:
each of the retransmitted data packets comprises a sequence number of the associated data packet of the stream of data packets originally transmitted from the first node to the second node.

7. The method of claim 1, wherein:
the status packet comprises a timestamp indicating when the status packet was transmitted from the second node to the first node;
each of the retransmitted data packets comprises an echoed timestamp comprising the timestamp of the status packet; and
the method further comprises calculating a roundtrip time at the second node, wherein the roundtrip time is based upon a time at which one the retransmitted data packets is received at the second node minus the echoed timestamp of the one of the retransmitted data packets.

8. The method of claim 7, further comprising:
transmitting a second status packet from the second node to the first node if the second node does not receive the retransmitted data packets from the first node within a time period of a previous transmission of the status packet, wherein the time period is based on the roundtrip time.

9. The method of claim 1, wherein:
the status packet is transmitted from the second node to the first node when the timestamp of at least one of the stream of data packets transmitted after at least one of the at least two of the stream of data packets is less than a time at which the at least one of the stream of data packets was received, minus a measured jitter of the stream of data packets and wherein the measured jitter is based upon an arrival time at the second node of, minus a timestamp of, each of a plurality of the stream of data packets.

10. A network node, comprising:
a communication interface configured to transmit a stream of data packets to another network node, and to receive a status packet from the other network node indicating that at least two of the stream of data packets were not received successfully at the other node, wherein the at least two of the stream of data packets are non-sequential within the stream of data packets; and
control circuitry configured to process the status packet and cause the communication interface to retransmit the at least two of the stream of data packets to the other network node;
wherein the control circuitry is configured to control a rate at which the communication interface transmits the stream of data packets to the other network node, wherein the rate is based on an estimated bandwidth of a connection between the network node and the other network node, wherein the estimated bandwidth is recalculated periodically;
and wherein the control circuitry is configured to recalculate the estimated bandwidth by increasing the estimated bandwidth by a percentage of the rate at which the communication interface transmits the stream of data packets if a loss percentage of the stream of data packets at the other network node is below a predetermined level, and to increase the estimated bandwidth by a second percentage of the rate at which the communication interface transmits the stream of data packets if the estimated bandwidth has been increased a predetermined number of consecutive times, wherein the second percentage is greater than the first percentage so that the percentage of the rate is increased during subsequent adjustments.

11. The network node of claim 10, further comprising:
memory buffers, wherein each of the memory buffers is configured to store one of the stream of data packets transferred to the other network node;
wherein the status packet further indicates a set of the stream of data packets that were received successfully at the other network node; and
wherein the control circuitry is configured to release each of the memory buffers that stores one of the set of the stream of data packets.

12. The network node of claim 10, wherein:
the control circuitry is configured to cause the communication interface to retransmit the at least two of the stream of data packets to the other network node at the rate at which the communication interface transmits the stream of data packets to the other network node.

13. The network node of claim 10, wherein:
the control circuitry is configured to set the estimated bandwidth to a mean of the estimated bandwidth and the rate at which the communication interface transmits the stream of data packets if the loss percentage of the stream of data packets at the other network node is at least at the predetermined level.

14. The network node of claim 10, wherein:
the control circuitry is configured to initiate a transmission of at least one of the stream of data packets by way of the communication interface in response to an occurrence of at least one of a time period, an addition of a data packet to be transmitted in the stream of data packets, and a receipt of the status packet from the other network node at the communication interface.

15. A network node, comprising:
a communication interface configured to receive a stream of data packets from another network node, wherein each of the stream of data packets comprises a timestamp;
a memory buffer configured to store the stream of data packets received from the other network node; and
control circuitry configured to determine which of the stream of data packets are not stored in the memory buffer, to generate a status packet indicating that at least two of the stream of data packets were not received successfully, and to transfer the status packet to the communication interface for transmission to the other network node, wherein the at least two of the stream of data packets are non-sequential within the stream of data packets, and wherein the status packet is transmitted from the second node to the first node when the timestamp of at least one of the stream of data packets transmitted after at least one of the at least two of the stream of data packets is less than a time at which the at least one of the stream of data packets was received, minus a measured jitter of the stream of data packets.

16. The network node of claim 15, wherein the control circuitry is further configured to measure the measured jitter of the stream of data packets.

17. The network node of claim 15, wherein:
the control circuitry is configured to cause the communication interface to transmit a second status packet to the other network node if an elapsed time since the first transmission of the status packet exceeds a timeout period based on a roundtrip time between the network node and the other network node, and the at least two of the stream of data packets are not successfully received at the communication interface during the elapsed time.

18. The network node of claim 15, wherein:
the control circuitry is configured to generate a second status packet comprising an indication of at least one of the stream of data packets, wherein each of the stream of data packets up to the at least one of the stream of data packets have been successfully received by the communication interface; and
the communication interface is configured to transfer the second status packet to the other network node.

19. The node of claim 18, wherein the memory comprises a plurality of memory buffers each configured to store one of the stream of data packets received from the other network node, and wherein the control circuitry is configured to generate the second status packet when a percentage of the memory buffers storing data packets of the stream of data packets successfully received but not acknowledged to the other network node attains a predetermined level.

* * * * *